United States Patent Office 2,981,753
Patented Apr. 25, 1961

2,981,753

PRODUCTION OF UNSATURATED ALDEHYDES

Robert M. Cole, Oakland, and John W. Mecorney, Lafayette, Calif., assignors to Shell Oil Company, a corporation of Delaware No Drawing. Filed Dec. 2, 1958, Ser. No. 777,603

5 Claims. (Cl. 260—601)

This invention relates to the production of highly pure unsaturated aldehydes. More particularly, this invention relates to the recovery of unsaturated aldehydes in a highly pure state from mixtures of such aldehydes with other compounds such as are obtained in the preparation and/or utilization of such aldehydes. In a particular aspect, this invention relates to the separation of alpha,beta-olefinically unsaturated aldehydes from crude mixtures thereof with other oxygen-containing compounds—chiefly carbonylic compounds and, in some cases, water—obtained on the controlled oxidation of alkenes, and especially the recovery of acrolein from the crude reaction mixture obtained on the controlled, catalytic oxidation of propylene. In a further particular aspect, this invention relates to separation of alpha,beta-olefinically unsaturated aldehydes, again especially acrolein, from mixtures thereof with water, particularly the azeotropic mixtures.

The unsaturated aldehydes, particularly the alpha,beta-olefinically unsaturated aldehydes, because they contain both olefinic saturation and a carbonyl group, form a class of compounds having a wide variety of potentially important applications. Efficient utilization of these aldehydes in many of their potential applications, however, depends upon the aldehydes being pure, and uncontaminated by more than traces of other materials. The large-scale production of such aldehydes is, therefore, of necessity limited to methods enabling the production of a product comprising the aldehyde in admixture with at most only very minor amounts of impurities. Further, in the large-scale use of such aldehydes, practical means must be available to insure that recycled aldehyde can be easily purified.

Production of such alpha,beta-olefinically unsaturated aldehydes as acrolein is possible by such reactions as the interaction of acetaldehyde and formaldehyde under carefully controlled conditions, the product being acrolein together with acetaldehyde, formaldehyde, acetone and propionaldehyde as by-products.

It has been proposed to prepare alpha,beta-olefinically unsaturated aldehydes by the controlled catalytic oxidation of olefins, in the presence of specific catalysts. It has recently been found that the readily available olefinic hydrocarbons can be converted efficiently to products consisting predominantly of unsaturated aldehydes such as, for example, the alpha,beta-unsaturated aliphatic aldehydes, by catalytic oxidation in the presence of specific catalysts. Thus acrolein is obtained by the catalytic oxidation of propylene. Such a process appears to be attractive, since olefins are readily available at low cost.

However, the crude products obtained from such processes ordinarily may contain, in addition to the unsaturated aldehyde, not only materials, such as saturated and unsaturated alcohols, acetaldehyde and formaldehyde, which usually are easily separated from the aldehyde by orthodox means, such as distillation, but also such materials as saturated aldehydes and ketones having the same number of carbon atoms as the unsaturated aldehyde, and boiling at a temperature so close to the boiling point of the unsaturated aldehyde that the unsaturated aldehyde cannot readily be separated by such orthodox means as distillation. For example, the production of an alpha-beta unsaturated aliphatic aldehyde from the corresponding olefin, such as, to mention a specific example, the production of acrolein from propylene, results in the production of a product comprising the acrolein in admixture not only with readily separable impurities (such as formaldehyde, acetaldehyde, isopropyl alcohol, allyl alcohol and high boiling material in the case of propylene oxidation) but also close-boiling carbonylic compounds (such as propionaldehyde and acetone, in the case of propylene oxidation) inseparable therefrom on a practical scale by separating means available heretofore. Often water also is present in the product, presenting a further problem in effecting separation of pure unsaturated aldehyde, since most of the unsaturated aldehydes form azeotropic mixtures with water. Inability to effect the efficient and yet substantially complete removal of impurities from crude acrolein has militated against the full realization of the substantial advantages inherent in the utilization of the readily available, low-cost olefins as source materials for alpha,beta-olefinically unsaturated aldehydes.

That the recovery of pure alpha,beta-olefinically unsaturated aldehydes from crude product reaction mixtures presents a real and substantial problem is recognized by the fact that the prior patent art discloses many attempts to solve that problem. Thus, each of the following United States patents discloses a process which is proposed to solve the problem: U.S. Patents No. 2,283,911, No. 2,476,391, No. 2,514,966, No. 2,514,967, No. 2,514,968, No. 2,542,752, No. 2,562,846, No. 2,574,935, No. 2,606,932, No. 2,606,933, No. 2,750,398 and No. 2,791,550. It will be noted that processes provided by these patents are all complex, involving at least two, and normally more, process steps.

Among the objects of the present invention, therefore, are:

a. Provision of an improved process for the more efficient purification of admixtures of alpha,beta-olefinically unsaturated aldehydes with other materials, particularly other materials which cannot readily be separated from the unsaturated aldehydes on a large scale in a practical manner by known methods;

b. Provision of an improved process for the more efficient purification of crude mixtures containing an alpha,beta-olefinically unsaturated aldehydes which are obtained on the controlled catalytic oxidation of olefins—particularly for the recovery of acrolein from the crude product of the controlled catalytic oxidation of propylene;

c. Provision of an improved process for the more efficient separation of alpha,beta-olefinically unsaturated aldehydes from admixtures thereof with oxygen-containing compounds not readily separable therefrom by practical scale fractionating means—particularly for recovery of such unsaturated aldehydes from mixtures thereof with saturated carbonylic compounds, and from mixtures thereof with saturated carbonylic compounds and water, said saturated carbonylic compounds containing the same numbers of carbon atoms as the unsaturated aldehydes;

d. Provision of an improved process for the more efficient separation of alpha,beta-olefinically unsaturated aldehydes from admixtures thereof with saturated aldehydes and/or ketones containing the same numbers of carbon atoms as the unsaturated aldehydes, and such admixtures also containing water;

e. Provision of an improved process for the more efficient separation of acrolein from mixtures thereof with acetone and/or propionaldehyde, and such mixtures also containing water.

Further, the utility of the alpha,beta-olefinically unsaturated aldehydes for many of their potential applications is often dependent upon those aldehydes being uncontaminated by water. However, such aldehydes as commercially available, or the unreacted aldehydes recovered from processes in which they are used, may contain water in varying amounts. Thus, water may be present with the unsaturated aldehyde as a by-product of the production of the aldehyde, or it may have been introduced during the use of the aldehyde, or as a component introduced during reaction, processing, or other treatment of the unsaturated aldehyde. Removal of substantially all water from alpha,beta-olefinically unsaturated aldehydes such as acrolein is very difficult as a practical matter on a large scale, in at least the cases of the lower molecular weight alpha,beta-olefinically unsaturated aldehydes, because those aldehydes form azeotropic mixtures with water under ordinary distillation conditions. The use of solvent extraction or like methods to purify the unsaturated aldehydes is often precluded because of the high reactivity of those aldehydes, which results in polymerization of the aldehydes under the conditions employed in the extraction. Although processes for purifying such alpha,beta-olefinically unsaturated aldehydes as acrolein from water are known, such processes all are complex and entail the use of several operative steps which must be carefully controlled to prevent polymerization of the unsaturated aldehydes during purification of those aldehydes.

It is therefore, also an object of the present invention to provide an improved process for the separation of water from mixtures of water with alpha,beta-olefinically unsaturated aldehydes, particularly acrolein.

Other objects and advantages of the invention will become apparent from the following detailed description thereof.

We have found that alpha,beta-olefinically unsaturated aldehydes can be obtained in a state of high purity from admixtures thereof with other materials, particularly oxygen-containing materials, including saturated carbonyl compounds and water, from which such unsaturated aldehydes are not readily separable by orthodox physical means, by reacting the unsaturated aldehyde with an alcohol to add the alcohol to the olefinic double bond of the aldehyde, thus forming the corresponding beta-ether-substituted saturated aldehydes, separating that ether-aldehyde from the reaction mixture and reverting the separated ether-aldehyde to its precursor alcohol and alpha,beta-olefinically unsaturated aldehyde and recovering the aldehyde from the resulting mixture of aldehyde and alcohol.

We have further found that this process is of particular utility for effecting separation of acrolein from mixtures thereof with such other materials as saturated carbonylic compounds, including propionaldehyde and acetone, and water.

Our new process is based upon several discoveries, the most important of which is the fact that the reaction involving addition of an alcohol to the olefinic bond of an alpha,beta-olefinically unsaturated aldehyde to form the corresponding beta-ether-substituted saturated aldehyde is a labile equilibrium reaction, and that the direction and extent of that reaction can readily be controlled, first to form the ether-aldehyde, and second, to cause reversion of that ether-aldehyde to its precursor alcohol and unsaturated aldehyde selectively without the formation of significant amounts of other products. We have found that the equilibrium involved in addition of the alcohol to the unsaturated aldehyde, and the rate of that reaction, as well as the rates of other reactions which may occur in a reaction mixture containing the alcohol and the unsaturated aldehyde are such that by proper choice of reaction conditions, substantially quantitative conversion of the alcohol and the unsaturated aldehyde to the corresponding beta-ether-substituted saturated aldehyde as substantially the only product can readily be effected. Likewise, we have found that by proper choice of reaction condition, the beta-ether-substituted saturated aldehyde can readily be substantially quantitatively reverted to the precursor alcohol and unsaturated aldehyde as substantially the only products.

Another discovery contributing to our new process is that the product beta-ether-substituted saturated aldehyde resulting from addition of an alcohol to the olefinic double bond of an alpha,beta-olefinically unsaturated aldehyde has a boiling point substantially different from the boiling points of the usual impurities which accompany the commercial, and/or recycled unsaturated aldehyde, and substantially different from the boiling points of any by-products resulting from side-reactions which accompany addition of the alcohol to the unsaturated aldehyde. Thus, by choosing an alcohol which boils at a substantially different temperature than does the unsaturated aldehyde and than does the saturated ether-aldehyde product, the saturated ether-aldehyde product is easily separated from the final crude reaction mixture resulting from addition of the alcohol to the unsaturated aldehyde. Also, the unsaturated aldehyde is easily separated from the alcohol-unsaturated aldehyde mixture obtained from reversion of the saturated ether-aldehyde.

Yet another discovery which contributes to our new process is that the usual contaminants in commercially available alpha,beta-olefinically unsaturated aldehydes do not interfere in the addition of the alcohol to the unsaturated aldehyde. Thus, such saturated carbonyl compounds as the saturated aldehydes and ketones are quite inert in the usual processes for effecting addition of the alcohol to the unsaturated aldehyde, and do not interfere with that addition; water likewise is substantially inert in such processes, and not interfere with the addition of the alcohol. If an alcohol is present in the crude mixture containing the unsaturated aldehyde, it will act as a reactant, and thus will not interfere with the intended recovery of the unsaturated aldehyde.

We also have discovered that pure beta-ether-substituted saturated aldehydes are quite stable, so that if desired, a substantial period of time may be permitted to lapse between formation and purification of the ether-aldehyde and its reversion. In fact, if desired, the ether-aldehyde can be prepared and purified at one place and the purified ether-aldehyde shipped to another place before it is reverted.

It will be evident that our discoveries thus provide an efficient, highly effective process for recovery of alpha,beta-olefinically unsaturated aldehydes from mixtures thereof with other compounds, particularly oxygen-containing compounds from which the unsaturated aldehyde can be separated only with difficulty by orthodox physical methods such as distillation.

Suitable processes for effecting addition of an alcohol to the olefinic double bond of an alpha,beta-olefinically unsaturated aldehyde are known in the prior art. Thus, suitable processes are taught in such patents as British Patents No. 693,843, No. 710,489 and No. 721,207, and in United States Patents No. 2,288,211, No. 2,504,680, No. 2,561,254, No. 2,694,732 and No. 2,694,733.

Briefly, according to these processes, addition of the alcohol to the unsaturated aldehyde is effected by simply mixing the aldehyde with an excess of the alcohol in the presence of a condensation catalyst at a low temperature. Suitable temperatures lie in the range of from about −50° C. to about +100° C., with the preferred temperatures being between about 0° C. and about 50° C. At least two moles, and preferably from about 2.5 to about 8 moles of alcohol are used per mole of aldehyde, representing at least a 100% and preferably from 150% to 700% excess of alcohol. A wide variety of acid and basic condensation catalysts have been found useful for the addition of the alcohol to the aldehyde. The suitable catalysts are summarized and described in U.S. Patent No. 2,561,254. Acid or basic salts—that is, salts which because of hydrolysis or otherwise provide an acid or basic condition in the reaction mixture—have been found to be suitable catalysts. As a general matter, it appears preferable to employ a catalyst which maintains the reaction mixture in a mildly alkaline to moderately acid state—that is, within a pH of from about 10.0 to about 3.5. Also, as a general matter, it appears desirable, irrespective of what catalyst is employed, to maintain the reaction mixture during removal of the product ether-substituted aldehyde, generally by distillation, in a slightly-to-moderately acid state—that is, within a pH range of from about 7.5 to about 3.5. Generally, it is desirable, at least during the product recovery step, to employ a buffered system to maintain the pH of the system at the desired level. From traces up to a substantial amount—i.e., from 0.01 to about 10% of the weight of the reaction mixture—of the catalyst have been found useful, the preferred amount of catalyst being from about 0.1 to about 2% of the weight of the reaction mixture. Since our invention does not reside in the discovery of a new process for the addition of an alcohol to an unsaturated aldehyde, for the sake of brevity of this description of our invention, the pertinent portions of the aforesaid patents are hereby incorporated herein and made a part of this specification.

As will be evident from the aforesaid patents, the addition of an alcohol to the double bond of an alpha,beta-olefinically unsaturated aldehyde is a general reaction. The alpha,beta-olefinically unsaturated aldehydes are those wherein the carbon atom involved in a carbonyl group is bonded by a single bond to a carbon atom which in turn is bonded in olefinic linkage to a third carbon atom. Suitably, the aldehyde may be a monoaldehyde, or it may be a polyaldehyde, and in the polyaldehydes, there may be present more than one olefinic linkage, provided each olefinic linkage is between the alpha and beta carbon atoms relative to an aldehyde group. Of course, the most widely available aldehydes containing alpha, beta-olefinic unsaturation are the monoaldehydes—i.e. compounds containing the structural moiety:

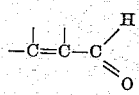

wherein each of the indicated free valence bonds is satisfied by hydrogen or by a hydrocarbyl radical, i.e. a group containing only hydrogen and carbon. The hydrocarbyl radical may be aliphatic in character, it may by cycloaliphatic in character, or it may be aromatic in character; it may be aliphatically unsaturated, or it may be saturated. Preferably, the hydrocarbyl radical is free from acetylenic unsaturation. If aliphatic, it may be of straight-chain configuration, or it may be of branched-chain configuration. If more than one of the three indicated free bonds is satisfied by a hydrocarbyl group, the hydrocarbyl groups may be different, or they may be the same, or they may have the same character—i.e., aliphatic or aromatic—or they may be of different character. Included in these aldehydes thus are those wherein the hydrocarbyl groups are alkyl, cycloalkyl, alkenyl, cycloalkenyl, aryl, alkaryl, aralkyl, or similar hydrocarbyl groups, specific examples of suitable hydrocarbyl radicals including the methyl, ethyl, n- and isopropyl radicals, and the various isomeric butyl, pentyl and like alkyl groups, the phenyl, tolyl, xylyl, benzyl and like groups containing an aromatic structure, the cyclohexyl group, the cyclohexenyl group, and like alicyclic groups, and the allyl, crotyl and like alkenyl groups. Because they are most widely available, the preferred aldehydes are those wherein the substituent group or groups attached to one or more of the indicated free valence bonds are alkyl groups, of this class, those wherein each of the alkyl groups contains from 1 to 6 carbon atoms being of greatest interest. This subclass of the suitable aldehydes includes acrolein and the members thereof other than acrolein are commonly known as substituted acroleins. Typical members of the class include crotonaldehyde, alpha-methyl acrolein, alpha-ethyl acrolein, tiglaldehyde, maleic dialdehyde and the like. Our new process is particularly effective in recovering pure acrolein from crude acrolein mixtures.

It is preferred, of course, that the alcohol chosen in any particular instance be free from substituent groups other than the alcoholic hydroxyl group or groups which are reactive with acrolein under the process conditions, so that undesirable side reactions will not occur. For this reason, it is preferred that the alcohol used containing only carbon, oxygen and hydrogen atoms, the two principal groups of these alcohols being the unsubstituted alcohols containing, in addition to one or more alcoholic hydroxyl groups, only carbon and hydrogen atoms, and the ether-alcohols—that is, alcohols containing one or more oxy(—O—) linkages. While the suitable alcohols may be either saturated or unsaturated, it is preferred that the alcohol used be fee from acetylenic unsaturation; thus the saturated and olefinically—either mono- or poly-olefinically—unsaturated alcohols are preferred. The suitable alcohols can be either straight-chain or branched-chain in configuration, and may contain in their structure either or both of alicyclic or aromatic carbon-to-carbon moities. While all of primary, secondary and tertiary alcohols are suitable, the alcohols containing at least one hydrogen atom bonded to a carbon atom to which an alcoholic hydroxyl group is bonded—that is, the primary and secondary alcohols—are most reactive, and are most suitable for this reason. The primary monohydric aliphatic alcohols are the most reactive. Examples of suitable alcohols thus include methanol, ethanol, n-propanol, n-butanol, n-hexanol, n-octanol, ethylene glycol, propylene glycol, and like straight-chain primary alkanols, isobutyl alcohol, isoamyl alcohol, sec-butylcarbinol and like branched-chain primary alkanols, isopropyl alcohol, sec-butyl alcohol, sec-amyl alcohol and cyclohexanol and like secondary alcohols, tert-butyl alcohol, tert-amyl alcohol and like tertiary alcohols, benzyl alcohol, phenethyl alcohol and like aralkyl primary alkanols, cyclohexylcarbinol, 2-cyclohexylethan-1-ol and like alicyclic-substituted primary alkanols, allyl alcohol, crotyl alcohol, allylcarbinol, propenylcarbinol, cinnamic alcohol, 4-pentenol, 2,4-pentadien-1-ol, 2,4-hexadienol and like alkenols and alkapolydienols, methoxymethanol, 2-methoxyethanol, ethoxymethanol, 2 - butyloxyethanol, 2 - (2 - methoxyethoxy)ethanol, 2-allyloxyethanol, 2-benzyloxymethanol, 2-phenoxyethanol, diethylene glycol and like ether-alcohols. Of particular interest because of their commercial availability at low cost are the primary monohydric aliphatic alcohols as herein described which contain from 1 to 8 carbon atoms, and of this group of alcohols, the alkanols of from 1 to 4 carbon atoms are of greatest interest.

Where the alcohol to be added is an allylic alcohol, the process used to add that alcohol to the unsaturated aldehyde preferably is that described in U.S. Patent No. 2,561,254. Where the unsaturated aldehyde is acrolein, regardless of the alcohol to be added, either the process described in U.S. Patent No. 2,694,732 or U.S. Patent No. 2,694,733 is used, or even more preferably, either the process described in copending application Serial No. 777,614, filed December 2, 1958, or the process described in copending application Serial No. 777,615, filed December 2, 1958, is used.

In the preferred embodiment of the process shown in Serial No. 777,615, addition of the alcohol is effected by mixing the reactants in the presence of about 3% of the weight of the mixed reactants of a mono(hydrocarbon amine) salt of phosphoric acid as catalyst, a reaction temperature of about 40° C. (e.g. from about 35° C. to about 45° C.) being maintained, and at least two to three moles of alcohol being used per mole of acrolein. Preferably, the reaction is maintained in a substantially anhydrous condition—no more than about 5% by weight of water in the reaction mixture being permitted.

In the preferred embodiment of Serial No. 777,614 addition of the alcohol is effected by mixing the reactants in the presence of about 3% of the weight of the mixed reactants of a mono(alkanolamine) salt of phosphoric acid as catalyst, at a reaction temperature of about 40° C., at least 2 or 3 moles of alcohol per mole of acrolein being used, and a substantial amount of water amounting to at least 5% of the weight of the reaction mixture being present in the reaction zone. As is pointed out in Serial No. 777,614, the preferred catalyst is the monoamine salt of phosphoric acid and an alkanolamine having a hydroxyalkyl group of from 1 to 7 carbon atoms bonded to the amino nitrogen and having each of the remaining valencies of the amino nitrogen satisfied by a member of the group consisting of hydroxyalkyl groups of from 1 to 7 carbon atoms, hydrocarbon groups of from 1 to 7 carbon atoms, and the hydrogen atom.

By conducting the addition of the alcohol to the acrolein according to one of these two preferred processes disclosed in these copending applications, substantially quantitative conversion of the acrolein to the corresponding beta-ether-substituted propionaldehyde as substantially the only product can be effected, thus considerably simplifying the recovery of the ether-aldehyde product. Further, in the process shown in Serial No. 777,615, the amount of water present in the acrolein-water azeotrope does not have a deleterious effect upon the desired reaction, while in the process of Serial No. 777,614, the catalyst is activated by water. Consequently, these methods are preferred for effecting addition of the alcohol to acrolein.

Again, in the interests of brevity yet to provide complete description of our invention, the pertinent disclosures of Serial No. 777,614 and Serial No. 777,615 are hereby incorporated into and made a part of this specification.

Recovery of the product beta-ether-substituted aldehyde is effected by any one or more of the usual methods, including distillation, extraction, extractive distillation, and like techniques. The particular method used in any given case will, of course, depend upon the physical character of the reaction mixture, and of each of the various components thereof. If a solid material is present in the crude reaction mixture—because of the use of a solid, reaction mixture-insoluble catalyst, or because of the formation of solid materials during the course of the process—in many cases, such solid material is advantageously removed by filtration, decantation, and/or centrifugation of the crude mixture before further treatment of that mixture.

However, as has already been pointed out herein, we have found that by proper choice of the alcohol reactant, the beta-ether-substituted aldehyde product has a boiling point sufficiently different from the boiling points of the usual impurities which accompany the commercial and/or recycled unsaturated aldehyde, and sufficiently different from the boiling points of any by-products resulting from the side reactions which accompany addition of the alcohol to the unsaturated aldehyde, that the product ether-aldehyde is easily separated from the crude reaction mixture resulting from addition of the alcohol to the unsaturated aldehyde by distillation techniques. We have further found that separation of the product ether-aldehyde from the crude reaction mixture by distillation techniques is entirely feasible, provided that the distillation technique used effects very rapid removal of the product ether-aldehyde from the reaction mixture, and this preferably at a temperature not substantially greater than the temperature at which addition of the alcohol to the unsaturated aldehyde was effected. We have found that when the product ether-aldehyde is recovered by such techniques, substantially no significant decomposition of the product ether-aldehyde occurs, and that substantially no other undesirable side-reactions take place to any significant extent. Thus, preferably, the product ether-aldehyde is recovered from the crude reaction mixture by "flashing" of the product ether-aldehyde, together with any materials boiling at a temperature below that at which the product ether-aldehyde boils, from the crude reaction mixture. The product ether-aldehyde then can be separated from any other materials which flashed overhead by any of the aforesaid methods; preferably, however, the product ether-aldehyde is separated from the other materials by distillation techniques, such techniques being quite feasible and normally most convenient.

In some cases, primarily depending upon the particular process and/or catalyst used, addition of the alcohol to the unsaturated aldehyde will be accompanied by acetal formation. Where such occurs, it is desirable that the acetal be recovered, but recovered separately, for subsequent treatment to recover the precursor alcohol and unsaturated aldehyde, that treatment to be described in detail hereinafter.

Reversion of the beta-ether-substituted aldehyde to its precursor alcohol and alpha, beta-olefinically unsaturated aldehyde is effected by subjecting the substantially pure ether-aldehyde to the combined effect of heat and of a catalyst of the group consisting of acids and bases at a temperature above about 100° C., removing the unsaturated aldehyde from the reaction mixture substantially as fast as that aldehyde is formed by reversion of the ether-aldehyde.

The suitable catalysts are the acids and bases, including acid salts and basic salts (salts which because of hydrolysis or otherwise provide an acid or basic condition in the reaction mixture). Suitable acids and bases are those which have been described herein for effecting addition of the alcohol to the unsaturated aldehyde. Since basic condensation catalysts tend to promote condensation of both the ether-aldehyde and the unsaturated aldehyde in the absence of a large excess of alcohol, the acid condensation catalysts are preferred. Where an acid condensation catalyst is used, the principal by-product, if any, is the acetal of the alcohol and the unsaturated aldehyde, and this can also be reverted to the precursor alcohol and unsaturated aldehyde, as will be described hereinafter. To minimize acetal formation, it is desirable that the pH of the reaction mixture be not less than about 3.5, a reaction mixture pH of from about 6.5 to about 4.0 being generally most desirable. It has been found that the most effective catalysts are the amine salts of phosphoric acid which provide the indicated reaction mixture pH. Of particular value is ammonium dihydrogen phosphate, and the amine salts of phosphoric acid described in copending applications Serial No. 777,614 and Serial No. 777,615, which amine salts have already been described herein. These amine phosphate catalysts have proven to be particularly selective in action, effecting substantially quantitative reversion of the ether-aldehyde to the precursor unsaturated aldehyde and alcohol, with virtually no formation of by-products. For description of these catalysts, the pertinent portions of the said copending applications are hereby incorporated herein and made a part hereof.

In many cases, mere traces of the catalyst are sufficient to effect the desired reversion of the ether-aldehyde, and seldom will it be necessary to employ an amount of catalyst in excess of about 10% of the weight of the ether-aldehyde, although the use of higher concentrations of catalyst will not have a deleterious effect on the desired reaction, and will not promote undesirable side reactions provided the pH of the reaction mixture is maintained within the stated limits. In most cases, it will be found desirable to employ at least about 0.1% catalyst, based on the weight of ether-aldehyde. As will be pointed out hereinafter, the concentration of catalyst employed desirably is correlated with the reaction temperature used.

Reversion of the ether-aldehyde is accomplished by heating it in the presence of the catalyst at a temperature of at least about 100° C., but preferably below the temperature at which the ether-aldehyde boils under the pressure used. However, while in general, the reversion of the ether-aldehyde goes forward more rapidly as the temperature is increased, at the same catalyst concentration, reaction temperatures in excess of about 200° C. will seldom be found of advantage over somewhat lower reaction temperatures. Ordinarily, a reaction temperature of about 170° C. will be found to be the practically desirable maximum.

In general, it is desirable to employ as high a temperature as is feasible, and to employ as low a catalyst concentration as is feasible. In general, also we have found that the lower the reaction temperature, the higher the catalyst concentration required to provide about the same reaction rate. Preferably, reaction temperatures of about 140° C.—e.g., from about 120° C. to about 150° C.—are used, and a catalyst concentration of from about 0.5% to about 3% of the weight of the ether-aldehyde is employed. If lower reaction temperatures—for example, temperatures of from about 100° C. to about 120° C.—are used, it is preferred to use a catalyst concentration of from about 1% to about 5% of the weight of the ether-aldehyde.

The reversion of the ether-aldehyde can be carried out at any pressure, including atmospheric, superatmospheric and subatmospheric, that may be convenient and desirable. Thus, if the ether-aldehyde boils, at a given pressure, at a temperature below that at which the reaction is to be conducted, the boiling temperature can be raised by increasing the pressure as necessary to obtain the desired temperature. Alternatively, the necessary higher temperature can be obtained without increase in the system pressure by adding an inert liquid diluent which boils at a sufficiently high temperature that the necessary reaction temperature can be readily attained. Suitable inert liquid diluents are polar materials which are miscible with the ether-aldehyde, examples being sulfolane, hydrocarbon-substituted sulfolanes, dialkyl formamides, sulfoxides and the like. A particularly convenient source of the diluent comprises the bottoms material—i.e., "heavy ends"—remaining after distillation of the ether-aldehyde from the crude reaction mixture obtained on addition of an alcohol to an alpha,beta-olefinically unsaturated aldehyde as set out hereinbefore. These "heavy ends" are quite similar in chemical character to the "heavy ends" which may be formed in small amounts during conversion of the ether-aldehyde to its precursor alcohol and alpha,beta-olefinically unsaturated aldehyde.

In the event that acetal formation accompanied the addition of the alcohol to the unsaturated aldehyde, the acetal can be converted to its precursor alcohol and unsaturated aldehyde in a manner identical to that used for reversion of the ether-aldehyde, with the exception that in the case of the acetal, the amount of water required to react with the acetal must be provided in the reaction zone. Should any acetal be formed during the reversion of the ether-aldehyde, this acetal is separated from the alcohol and unsaturated aldehyde, and the separated acetal is converted to its precursor alcohol and unsaturated aldehyde in a like manner.

During the reversion of the ether-aldehyde, the resulting unsaturated aldehyde is removed from the reaction mixture. Again, in this reaction system, we have found that distillation techniques are feasible for effecting the separation and are probably the most convenient for the purpose. Thus, we have found that the unsaturated aldehyde can be distilled from the reaction mixture without the formation of practically significant amounts of undesirable by-products. Conveniently, the unsaturated aldehyde, together with any materials boiling at or below the boiling temperature of that aldehyde (including the alcohol resulting from reversion of the ether-aldehyde, if that alcohol boils at or below the boiling temperature of the unsaturated aldehyde) is distilled overhead substantially as fast as it is formed, and then the unsaturated aldehyde is recovered in pure form by a further suitable distillation of the overhead product. In fact, we have found that a preferred technique for conducting the reversion of the ether-aldehyde comprises passing the ether-aldehyde intermittently or continuously to the reboiler of a fractional distillation column, that reboiler containing the catalyst, and the bottoms being held at the desired reaction temperature, and recovering substantially pure unsaturated aldehyde from the column. While a "flashing" technique may be used—that is, the pressure in the column may be reduced so that the alcohol and unsaturated aldehyde will distill overhead at a lower temperature and higher rate—such is not necessary, and the pressure in the column conveniently may be maintained at substantially atmospheric pressure.

The pure beta-ether-substituted aldehydes have been found to be quite stable, particularly at ordinary room temperatures. Hence, it is not necessary to effect reversion of ether-aldehyde immediately after it is purified—an indefinite time period may intervene. This fact has led to the discovery of a further advantage of our invention, namely: that the invention provides an improved method for storing and/or shipping alpha,beta-olefinically unsaturated aldehydes. This method comprises simply preparing and purifying the ether-aldehyde from the unsaturated aldehyde to be stored and/or shipped, then storing and/or shipping the ether-aldehyde. When the unsaturated aldehyde is needed, the ether aldehyde is reverted. This method provides a substantial advantage, for the alpha,beta-olefinically unsaturated aldehydes—and particularly acrolein—are notoriously difficult to store and ship in their monomeric form. Because of their high reactivity, such aldehydes tend to polymerize during shipment and/or storage, so that polymerization inhibitors must be used and/or the temperature must be carefully controlled during shipment and storage. Further, acrolein and other like unsaturated aldehydes are volatile and are strong lachrymators which necessitate careful closure and handling of containers in which they are stored and/or shipped. Storage and/or shipment of the unsaturated aldehydes in the form of the relatively nonvolatile, stable ether-aldehydes thus is substantially more convenient.

The foregoing constitutes a general description of the process of this invention. The following examples are set out for the purpose of illustrating application of that process in particular cases. It is to be understood that these examples are included only for the purpose of illustrating the invention, and are not to be considered as limiting the invention in any way not recited in the appended claims.

EXAMPLE I

A crude acrolein-containing mixture having the composition set out in Table I was purified according to this invention in the following-described manner.

*Table I.—Composition of crude acrolein mixture*

| Component: | Amount—percent by weight |
|---|---|
| Acrolein | 75 |
| Acetone | 3.5 |
| Propionaldehyde | 2.0 |
| Acetaldehyde | 9.0 |
| Water | 7.5 |
| Allyl alcohol | 1.0 |
| Saturated $C_1$—$C_3$ alcohols | 1.0 |
| Polymer and other trace materials | 1.0 |

Ethanol was added to the acrolein using the process of Serial No. 777,615, that is, by reacting ethanol with acrolein, in a mole ratio of 3 to 1, at a temperature of 40° C.

in the presence of 3% of the weight of the ethanol-acrolein mixture of mono(triethylamine)-phosphate as catalyst. Conversion of the acrolein was substantially quantitative, with a yield of about 95% beta-ethoxypropionaldehyde and other beta-alkoxypropionaldehydes, such as beta-allyloxypropionaldehyde and beta-n-propoxypropionaldehyde, about 2% of acetals, and the remainder "heavy ends." The beta-ethoxypropionaldehyde, together with the other beta-alkoxypropionaldehydes, was recovered by flash distillation of the crude reaction mixture, followed by fractional distillation of the overhead product.

The beta-ethoxypropionaldehyde (plus the other beta-alkoxypropionaldehydes) thus obtained was reverted to ethanol and acrolein by batch distillation in a 20-plate Oldershaw column, the reversion being carried out in the column kettle. There was used 3.0% by weight of the alkoxypropionaldehyde of mono(triallylamine)phosphate as catalyst, the reaction mixture being adjusted to a pH of about 4.0 by addition of phosphoric acid. The reaction was begun at about 92° C., with a final kettle temperature of about 125° C. Conversion of the beta-alkoxypropionaldehydes was substantially quantitative. The redistilled acrolein contained but a trace of acetone and acetaldehyde, and no propionaldehyde.

EXAMPLE II

A partially purified crude acrolein mixture, composition given in Table II, was purified in the manner set out in Example I.

*Table II.—Composition of partially purified acrolein mixture*

| Component: | Amount—percent by weight |
|---|---|
| Acrolein | 92.8 |
| Acetone | 4.5 |
| Propionaldehyde | 2.7 |
| Water | Trace |

The final acrolein product contained about 0.1 percent by weight acetone, no propionaldehyde and about 0.2 percent by weight of ethanol.

EXAMPLE III

Experiments were performed to determine optimum catalyst concentration relative to reaction temperature in effecting the reversion of beta-ethoxypropionaldehyde. The catalyst in all cases was mono(triamylamine)phosphate. These experiments were performed by adding the ethoxypropionaldehyde semi-continuously to the kettle of a 20-plate Oldershaw column. In experiments Nos. 1 and 2, "heavy ends" obtained from preparation of the beta-ethoxypropionaldehyde were added to permit the higher reaction temperatures without use of higher pressure. The results are summarized below.

| Expt. No. | Initial Kettle Comp. (Percent by weight) | | | Kettle Temp. (° C.) | Conv. of Ethoxypropionaldehyde | Yield of Acrolein (Percent) |
|---|---|---|---|---|---|---|
| | Catalyst | Diluent | Ethoxypropionaldehyde | | | |
| 1 | 0.7 | 25 | 74 | 130–140 | Substantially quantitative | 97.0 |
| 2 | 3.0 | 25 | 72 | 110–120 | ---do--- | 95.5 |
| 3 | 3.0 | 0 | 97 | 100–110 | ---do--- | 93.0 |

The product from experiment No. 1 was redistilled to give acrolein substantially free from acetone and propionaldehyde, although the original acrolein mixture from which the ethoxypropionaldehyde was prepared contained substantial amounts of each of those compounds.

We claim as our invention:

1. A process for producing a substantially pure alpha, beta-alkenal from a crude mixture containing such alkenal and a saturated carbonyl compound containing the same number of carbon atoms as said alkenal, said process comprising the steps of reacting the crude alkenal-containing mixture with an aliphatic alcohol of from 1 to 8 carbon atoms composed of the elements carbon, hydrogen and oxygen and containing only reactive hydroxyl, to effect addition of the alcohol to the olefinic double bond of the alkenal, separating by distillation the resulting beta-aliphatic-oxy-substituted alkanal from the resulting reaction mixture, heating the said alkanal at a temperature of from about 100° C. to about 200° C. in the presence of a catalyst the pH of the reaction mixture of alkanal and catalyst being maintained at a value above 3.5, whereby the said alkanal is split into the corresponding alpha, beta-alkenal and the corresponding aliphatic alcohol, removing by distillation from the reaction mixture the said alkenal substantially as fast as it is formed, and separating by distillation the substantially pure alkenal from any material which is also distilled from the reaction mixture.

2. A process for producing a substantially pure alpha, beta-alkenal from a crude mixture comprising such alkenal and at least one saturated carbonyl compound containing the same number of carbon atoms as said alkenal said process comprising the steps of reacting the crude alkenal-containing mixture with an alkanol containing from 1 to 8 carbon atoms to effect addition of the alkanol to the olefinic double bond of the alkenal, separating by distillation the resulting beta-alkoxy-substituted alkanol from the resulting reaction mixture, heating the said alkanal at a temperature of from about 100° C. to to about 200° C. in the presence of a catalyst the pH of the reaction mixture of alkanal and catalyst being maintained at a value above 3.5, whereby the said alkanal is split into the corresponding alpha, beta-alkenal and the corresponding alkanol, removing by distillation from the reaction mixture the said alkenal substantially as fast as it is formed, and separating by distillation the substantially pure alkenal from any material which is also distilled from the reaction mixture.

3. The process according to claim 2 wherein the crude alkenal-containing reaction mixture contains water and the catalyst is a monoamine salt of phosphoric acid and an alkanolamine having a hydroxyalkyl group of from 1 to 7 carbon atoms bonded to the amino nitrogen and having each of the remaining valencies of the amino nitrogen satisfied by a member of the group consisting of hydroxyalkyl groups of from 1 to 7 carbon atoms, hydrocarbon groups of from 1 to 7 carbon atoms, and the hydrogen atom.

4. A process for preparing substantially pure acrolein from a mixture of water and acrolein, said process comprising the steps of reacting the said mixture with an alkanol of from 1 to 8 carbon atoms to effect addition of the alkanol to the olefinic double bond of the acrolein, separating by distillation the resulting beta-alkoxypropionaldehyde from the resulting reaction mixture, heating the said beta-alkoxypropionaldehyde in the presence of a monoamine salt of phosphoric acid and an alkanolamine having a hydroxyalkyl group of from 1 to 7 carbon atoms bonded to the amino nitrogen and having each of the remaining valencies of the amino nitrogen satisfied by a member of the group consisting of hydroxyalkyl groups of from 1 to 7 carbon atoms, hydrocarbon groups of from 1 to 7 carbon atoms, and the hydrogen atom.

5. A process for preparing substantially pure acrolein from a crude mixture comprising acrolein and at least one saturated carbonyl compound containing three carbon atoms, said process comprising the steps of reacting the crude acrolein-containing mixture with an alkanol of from 1 to 8 carbon atoms to effect addition of the alkanol to the olefinic double bond of the acrolein, separating by distillation the resulting beta-alkoxypropionaldehyde from the resulting reaction mixture, heating the said beta-alkoxypropionaldehyde at a temperature of from about 100° C. to about 200° C. in the presence of a catalyst of the group consisting of ammonium dihydrogen phosphate and a mono-amine salt of phosphoric acid and an alkanolamine having a hydroxyalkyl group of from 1 to 7 carbon atoms bonded to the amino nitrogen and having each of the remaining valencies of the amino nitrogen satisfied by a member of the group consisting of hydroxyalkyl groups of from 1 to 7 carbon atoms, hydrocarbon groups of from 1 to 7 carbon atoms, and the hydrogen atom, the pH of the reaction mixture of the beta-alkoxypropionaldehyde and catalyst being maintained at a value above 3.5, whereby the said beta-alkoxypropionaldehyde is split into acrolein and the corresponding alkanol, removing by distillation from the reaction mixture the acrolein substantially as fast as it is formed, and separating by distillation the substantially pure acrolein from any material which is also distilled from the reaction mixture.

References Cited in the file of this patent

UNITED STATES PATENTS

| | | |
|---|---|---|
| 2,514,966 | Pierotti et al. | July 11, 1950 |
| 2,514,967 | Pierotti et al. | July 11, 1950 |
| 2,514,968 | Dunn | July 11, 1950 |
| 2,561,254 | Whetstone et al. | July 17, 1951 |
| 2,574,935 | Pierotti et al. | Nov. 13, 1951 |
| 2,694,732 | McTeer et al. | Nov. 16, 1954 |
| 2,694,733 | McTeer et al. | Nov. 16, 1954 |
| 2,704,298 | Bellringer et al. | Mar. 15, 1955 |

FOREIGN PATENTS

| | | |
|---|---|---|
| 525,292 | Canada | May 22, 1956 |